July 9, 1968 D. J. GRIFFIN 3,392,350

VARIABLE TIMING CIRCUIT

Filed Dec. 6, 1966 2 Sheets-Sheet 1

INVENTOR

DANIEL J. GRIFFIN

BY Tipton D. Jennings

ATTORNEY

July 9, 1968 D. J. GRIFFIN 3,392,350

VARIABLE TIMING CIRCUIT

Filed Dec. 6, 1966 2 Sheets-Sheet 2

INVENTOR

DANIEL J. GRIFFIN

BY Tipton D. Jennings

ATTORNEY

United States Patent Office 3,392,350

Patented July 9, 1968

3,392,350

VARIABLE TIMING CIRCUIT

Daniel J. Griffin, Upland, Calif., assignor to The Susquehanna Corporation, a corporation of Delaware

Filed Dec. 6, 1966, Ser. No. 599,631

7 Claims. (Cl. 331—74)

ABSTRACT OF THE DISCLOSURE

This variable period timing circuit uses a conventional pulse generator to drive a number of binary stages. In order to obtain a variety of timing periods which are not limited to whole number multiples of the basic clock period, the outputs of the binary stages are selectively patched to two AND gates. The outputs of these AND gates control the application of additional impedance into the timing circuitry of the pulse generator. This added impedance varies the period of the oscillator and thereby the length of the overall timing period.

This invention relates to a timing circuit. More particularly, this invention relates to a timing circuit having a variable period which permits the circuit to be utilized to generate a wide range of time periods or time delays.

Accurate timing circuits are necessary for many applications. Laboratory tests and industrial processes, for example, frequently need accurate timing signals for control purposes. It is often necessary to vary the length of such timing signals so that a process may be varied or results of an operation studied under varying conditions. Electronic equipment may also require a timing circuit to provide switching at discrete intervals during performance of tests or processes. During experimentation, it may be desirable to generate an output signal at repeated intervals, e.g., once every 250 microseconds; thereafter, it may be desirable to rerun the same experiment with an output once every 500 microseconds. In such situations it is necessary to have a timing circuit capable of generating signals at variable intervals of time. For laboratory or industrial tests and operations to be meaningful and practical requires that these time periods be accurately generated.

It is well-known to utilize as a timing circuit a pulse generator, frequently termed a clock for feeding a multistage binary scaler. Prior-art timing circuits of this type provide variable timing signals by varying the connections between the different stages in the binary scaler. Thus, by way of example, with the binary stages set in a first manner, prior-art timing circuits might divide the basic clock frequency by eight, while changing the connections between the stages may result in the division of the basic clock frequency by another number, such as ten. While such timing circuits permit generation of a variety of timing periods, these timing periods are all limited to a whole number multiple of the basic clock period. Therefore, only limited flexibility can be achieved.

The present invention is broadly directed to a variable period timing circuit in which the output of a pulse generator or clock is divided by a scaler having a plurality of outputs. Gating means are fed by the scaler outputs, and this gating means in turn operates control means for varying the basic clock period in an accurate and repeatable manner.

It is thus an object of the present invention to provide an improved timing circuit having variable timing periods.

It is another object of the present invention to provide an improved timing circuit in which it is possible to obtain a wide variety of timing periods without being restricted to an integral or whole number multiple of the basic clock period.

It is a further object of the present invention to provide a versatile timing circuit which can generate a wide variety of timing signals without requiring complex circuitry.

These and other objects and advantages of the subject invention will be apparent from a reading of the following detailed description and claims, when taken in conjunction with the accompanying drawings in which like parts bear like reference numerals.

Figure 1:
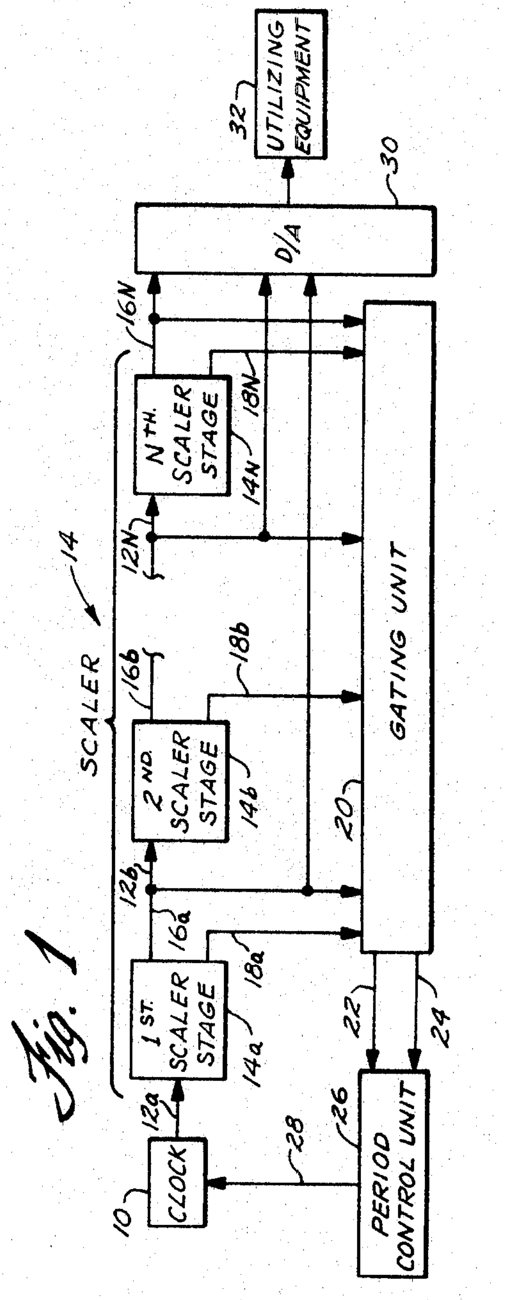
FIGURE 1 is a block diagram of the present invention.

In FIGURE 1 the timing circuit is shown composed of a clock 10, the output of which is applied by line **12*a* to first binary stage 14*a* of a scaler 14. Binary stage 14*a* can be a well-known flip-flop circuit which is capable of assuming either of two energization states or conditions and which is triggered between its two conditions by the input on line 12*a*. Binary stage 14*a* has two outputs, a first output on line 16*a* and a second output on line 18*a*. The energization states of the two lines 16*a* and 18*a* alternate in response to input pulses on line 12*a* as the stage 14*a* alternates between its two energization states. The output on line 16*a* is utilized as the input to the second binary stage 14*b* by line 12*b*. The second binary stage 14*b* is identical with the first stage 14*a*, and it provides a first output on line 16*b* and a second output on line 18*b*. Line 16*b* also provides the input to the next binary stage 14*c* via line 12*c* (not shown). Any number of binary stages can be utilized in scaler 14**, depending upon the degree of flexibility which is desired in the timing circuit. Thus, FIGURE 1 shows an N-stage scaler or counter. The *n*th stage receives its input on line 12N from a next previous stage and generates outputs on first output line 16N and on second output line 18N.

Output lines 16 and 18 from the stages 14 are all fed to a gating unit 20 which in turn controls, by the signals it applies onto output lines 22 and 24, the period control unit 26. Via line 28, the period control unit 26 varies the period of clock 10. It can thus be seen from FIGURE 1 that the period of clock 10 is unchanged until the outputs of the binary scaler 14 trigger gating unit 20 to cause it to command period control unit 26 to change this period.

As shown in FIGURE 1, the first output lines 16 from each of the counter stages are also connected to a digital-to-analog converter 30 in which the output signals are changed to an analog signal which then is applied to the utilizing equipment 32. As one alternative, the output from the timing circuit may be obtained from both of the scaler output lines 16 and 18, which can be gated directly to the utilizing equipment, as desired.

Figure 2:
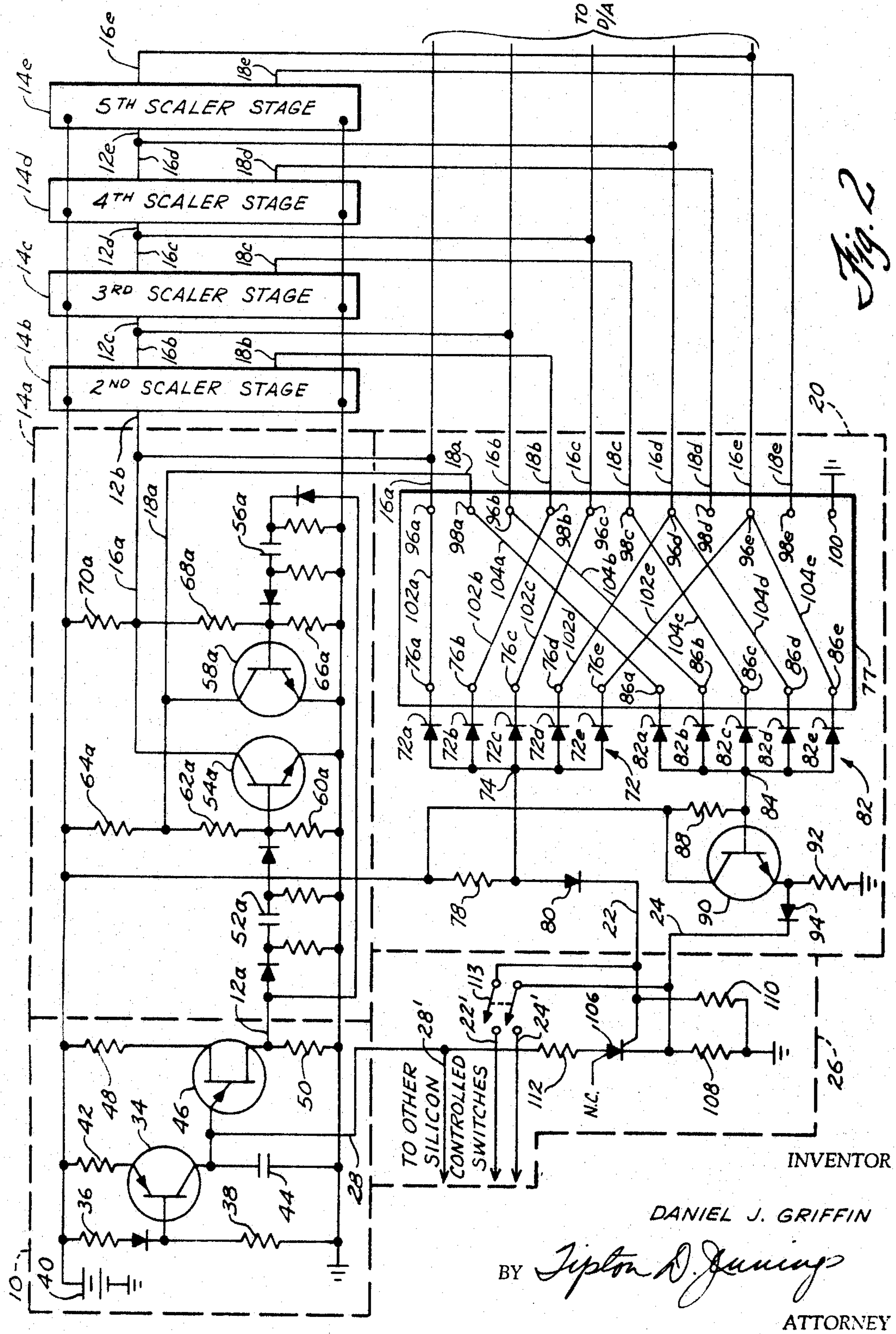
FIGURE 2 is a diagram, partially schematic and partially a block form, showing details of the circuitry of a preferred embodiment of the present invention.

FIGURE 2 depicts the detailed circuitry of a preferred embodiment of the subject invention. The pulse generator or clock 10 is depicted as a standard unijunction transistor relaxation oscillator. Within it, PNP transistor 34 is connected as a constant current source with its base tied to the voltage divider made up of resistors 36 and 38 which are connected between positive voltage source 40 and ground. The emitter of transistor 34 connects through resistor 42 to the voltage source 40. The collector of transistor 34 is tied to one side of capacitor 44, which has its other side tied to ground. The collector of transistor 34 is also connected to the base of unijunction transistor (UJT) 46. Base 2 of UJT 46 connects through resistor 48 to the voltage source 40, while base 1 of the UJT connects through resistor 50 to ground. In this configuration, a constant current will flow from the collector of transistor 34 to charge capacitor 44 until the firing potential of UJT 46 is reached. At that instant the UJT will fire, and a positive voltage pulse will occur across resistor 50. Once the voltage on capacitor 44 has discharged through UJT 46, the UJT will cease conducting, and the voltage will again accumulate on capacitor 44. Thus, the circuit operates as a relaxation oscillator.

Line 12*a*, which brings the output from clock 10 to first binary stage 14*a*, is connected from base 1 of UJT 46 through capacitor 52*a* to the base of NPN transistor 54*a* within binary circuit 14*a*. Line 12*a* also connects through capacitor 56*a* to the base of NPN transistor 58*a* within the binary circuit. Transistors 54*a* and 58*a* are connected as a standard Eccles-Jordan bistable multivibrator circuit or flip-flop. The base of transistor 54*a* is connected to the junction of resistors 60*a* and 62*a* which, with resistor 64*a*, form a voltage divider between positive voltage source 40 and ground. Similarly, the base of transistor 58*a* is connected to the junction of resistors 66*a* and 68*a* which, with resistor 70*a*, form another voltage divider between positive source 40 and ground. The collector of transistor 54*a* is tied to the junction of resistors 68*a* and 70*a*, while the collector of transistor 58*a* is tied to the junction of resistors 62*a* and 64*a*. The emitters of transistors 54*a* and 58*a* are both tied to ground. One output line 16*a* is connected to the collector of transistor 54*a*; while the second output line 18*a* is connected to the collector of transistor 58*a*. Line 12*b* is connected to line 16*a* and leads to the second binary stage 14*b*.

The second, third, fourth and fifth binary stages 14*b*, 14*c*, 14*d*, and 14*e*, respectively, are identical with the first binary stage 14*a*, and so they will not be described in detail. Each of these binary stages has an input line 12 respectively, 12*b*, 12*c*, 12*d*, and 12*e*; a first output line 16, respectively, 16*b*, 16*c*, 16*d*, and 16*e*; and a second output line 18, respectively, 18*b*, 18*c*, 18*d*, and 18*e*. First output lines 16*b*, 16*c*, and 16*d* are connected to the input lines 12*c*, 12*d*, and 12*e*, respectively. Each output line 16 is also connected to the digital-to-analog converter (not shown) or other output device.

Gating unit 20 includes two AND gates 72 and 82. The first AND gate 72 is made up of diodes 72*a*, 72*b*, 72*c*, 72*d* and 72*e*. The anodes of these five diodes are tied together at junction point 74. The cathodes of the diodes 72*a*, 72*b*, 72*c*, 72*d*, and 72*e* are connected to terminals 76*a*, 76*b*, 76*c*, and 76*d*, and 76*e*, respectively. These terminals can, for example, be a part of a terminal board of patch panel 77. Junction 74 connects through resistor 78 to positive voltage source 40, and it connects to the anode of diode 80. The cathode of diode 80 is tied to output line 22 from gating unit 20.

Similarly, the second AND gate 82 is made up of five diodes 82*a*, 82*b*, 82*c*, 82*d*, and 82*e*. The anodes of these five diodes are tied together at junction point 84. The cathodes of the diodes 82*a*, 82*b*, 82*c*, 82*d*, and 82*e* are tied to terminals 86*a*, 86*b*, 86*c*, 86*d*, and 86*e*, respectively. These terminals again are a part of the terminal board or patch panel 77. Junction 84 connects through resistor 88 to positive voltage source 40. Junction 84 is also connected to the base of NPN transistor 90, which has its collector tied to the voltage source 40 and its emitter grounded through resistor 92. The emitter of transistor 90 is also connected to the anode of diode 94, which has its cathode tied to output line 24 from gating unit 20.

Each of the first output lines 16*a*, 16*b*, 16*c*, 16*d*, and 16*e* from scaler 14 is connected to a terminal 96*a*, 96*b*, 96*c*, 96*d*, and 96*e*, respectively, within gating unit 20. Similarly, each of the second output lines 18*a*, 18*b*, 18*c*, 18*d*, and 18*e* from the scaler is connected to a terminal 98*a*, 98*b*, 98*c*, 98*d*, and 98*e*, respectively, within unit 20. An additional terminal 100 is provided and is tied to ground. These terminals 96, 98, and 100 are formed as part of the same terminal board or patch panel 77 as the terminals 76 and 86.

Patch cords 102*a*, 102*b*, 102*c*, 102*d*, and 102*e* are provided to permit interconnection between the five terminals

76 and either the terminals 96 or the terminals 98, or any combination thereof. Similarly, patch cords 104*a*, 104*b*, 104*c*, 104*d*, and 104*e* are provided to permit interconnection between terminals 86 and either the terminals 96 or the terminals 98, or any combination thereof. By means of these patch cords, the two AND gates 72 and 82 can have their respective inputs connected to any combination of outputs from the binary scaler 14. Thus, the AND gates 72 and 82 generate outputs at terminals 74 and 84, respectively, at times determined by the interconnections made by the patch cords. These outputs will then appear on output lines 22 and 24, respectively, out of gating unit 20.

Within period control unit 26, input line 22 connects to the cathode-gate of silicon controlled switch (SCS) 106, and input line 24 connects to the cathode of SCS 106. The cathode of the SCS is connected to ground through resistor 108, and the cathode-gate is grounded through resistor 110. The anode of SCS 106 connects through resistor 112 to line 28 which connects it to the base of UJT 46 within clock 10. The anode-gate of SCS 106 has no connection. Thus, when SCS 106 is conducting, resistors 108 and 112 are in parallel with capacitor 44 in the base circuit of UJT 46.

Operation of the timing circuit can best be understood by initially assuming that the patch cords 102 and 104 are not in use, and so there are no inputs applied to the AND gates 72 and 82. As a result, SCS 106 is not conducting, and resistors 108 and 112 are not connected in the base circuit of UJT 46. Consequently, the period of the clock 10 is determined by the current through transistor 34, the size of the capacitor 44, and the characteristics and biasing of UJT 46. Assume that this period is 100 microseconds, equal to a frequency of 10 kc. Thus, a pulse is applied to first binary stage 14*a*, via line 12*a*, every 100 microseconds. By standard gating or connections of the output lines 16 and 18 between the five binary stages 14, system output pulses can be obtained at any period from 100 microseconds through 3200 microseconds, so long as that period is an integral or whole number multiple of 100 microseconds.

If pulses are desired at a period which is not an integral multiple of 100 microseconds, the basic timing circuit is not capable of generating it. However, with the present invention such periods are readily obtained. Assume, for example, that pulses are desired at a repetition interval of 630 microseconds. These can be obtained by changing the period of clock 10, after it has generated its second output pulse, from a time period of 100 microseconds to a time period of 110 microseconds. Then the fifth output pulse occurs at $100+100+110+110+110=530$ microseconds. If the period is then changed back to 100 microseconds, the sixth pulse occurs at the desired 630 microseconds and it is used as the output signal. The precise and novel manner by which this exemplary time period is attained is explained hereinafter.

Changing the time period of the clock 10 after the generation of the second output pulse requires that the SCS 106 be triggered "on" by that second output pulse to place resistors 108 and 112 into the base circuit of UJT 46. If initially (i.e. time zero) all the first output lines 16 from scaler 14 are energized and all the second output lines 18 are de-energized, then the second pulse from clock 10 causes output lines 16*a*, 18*b*, 16*c*, 16*d*, and 16*e* to be energized by virtue of the standard scaling operation. To utilize this condition to change the period of clock 10, the inputs to AND gate 72 are connected or patched as follows: Terminal 76*a* to terminal 96*a*, 76*b* to 98*b*, 76*c* to 96*c*, 76*d* to 96*d*, and 76*e* to 96*e*. Thus, at the time when the second clock pulse occurs, AND gate 72 becomes enabled, and the resulting pulse applied on line 22 to the cathode gate of SCS 106 turns on the SCS.

When SCS 106 is on, the value of resistors 108 and 112 in parallel with capacitor 44 in the base circuit of UJT 46 increases the period of the UJT clock from 100 microseconds to 110 microseconds. Therefore, the third pulse from the clock 10 occurs at 310 microseconds, the fourth pulse at 420 microseconds, and the fifth pulse at 530 microseconds.

After the fifth pulse from clock 10, the following output lines 16 and 18 will be energized: line 18*a*, line 16*b*, 18*c* 16*d*, and 16*e*. To utilize these output states, terminals 86 are patched to terminals 98 as follows: Terminal 86*a* connected to terminal 98*a*, 86*b* to 96*b*, 86*c* to 98*c*, 86*d* to 96*d*, and 86*e* to 96*e*.

Therefore, in operation, the fifth pulse causes the enabling of AND gate 82, turning on transistor 90. A positive potential appears on output line 24 and is applied to the cathode of SCS 106, turning it off. Resistors 108 and 112 are removed from the base circuit of UJT 46, and the period of clock 10 again becomes 100 microseconds. The sixth pulse thus occurs at 630 microseconds.

It will be observed that different patching arrangements between the terminals 76 and the terminals 96 and 98, and between the terminals 86 and the terminals 96 and 98, so that the SCS is gated at different times, can give the same result as just described in the example. It is only necessary that the period of clock 10 be lengthened for the required number of pulses. Thus, in the above example, SCS 106 can be gated on by the first pulse and off by the fourth, or it can be turned on by the third pulse and off by the sixth.

In the illustrative example of the system operation described above, resistors 108 and 112 were selected with precise values to permit enough current to flow through them so that ten microseconds were added to the period of clock 10. Obviously, in view of this teaching other resistance values can be chosen for resistors 108 and 112 to obtain other lengths of time in the generation of the total pulse period. This invention also contemplates the use of a number of silicon-controlled switches 106 within the period control unit 26, each SCS when actuated placing a different value of resistance in parallel with capacitor 44. If desired, additional patch panels identical to patch panel 77 can be provided with the outputs from each panel gating an additional SCS circuit having a precise value of resistance. Or instead the output lines 22 and 24 from patch panel 77 can gate each additional SCS in a selective manner through the use, for example, of a simple switch leading to each SCS. This latter arrangement is shown in FIGURE 2 where lines 22′, 24′, and 28′ lead to one or more silicon-controlled switches and their associated resistors in the period control unit. A switch 113 is represented schematically to illustrate the selectiveness. In this type of arrangement, of course, a switch 113 would be provided in all lines 22 and 24.

Figure 3:
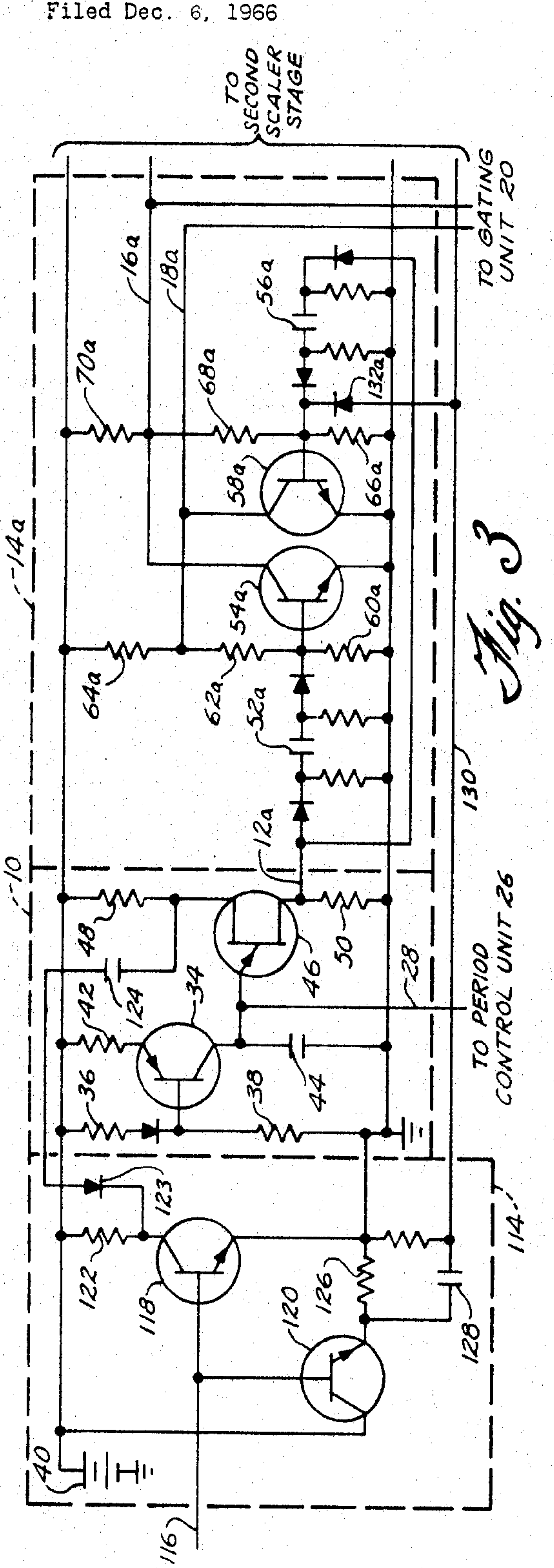
FIGURE 3 is a schematic diagram of a second embodiment of the present invention.

FIGURE 3 shows an adaptation which permits the timing circuit to be utilized as a time delay network. A synchronizing input is added to the clock 10 and to each stage of scaler 14, the circuitry of both being identical to that shown in FIGURE 1. In synchronizing unit 114, line 116 connects to the base of NPN transistor 118 and to the base of NPN transistor 120. Transistor 118 has its collector connected through resistor 122 to positive voltage source 40 and its emitter grounded. The collector of transistor 118 is also tied to the cathode of diode 123, the anode of which is connected through capacitor 124 to base 2 of UJT 46 within clock 10.

Transistor 120 has its collector tied to positive voltage source 40 and its emitter grounded through resistor 126. The emitter of transistor 120 is also connected to one side of capacitor 128, the other side of which is tied to line 130 which carries the synchronizing signals to each of the binary stages within scaler 14. Diode 132*a* within first binary stage 14*a* has its anode connected to line 130 and is cathode tied to the base of transistor 58*a*. Similar diodes 132*b*, 132*c*, etc., connect line 130 to the base of the corresponding transistors 58*b*, 58*c*, etc. within the other stages of binary scaler 14 which have not been redrawn in FIGURE 3.

With no input on line 116, transistors 118 and 120 are cut off, and so the collector of transistor 118 is at the potential of positive voltage source 40 while the emitter of transistor 120 is at ground potential. A positive synchronizing pulse on line 116 turns on transistors 118 and 120. This pulls the collector of transistor 118 to essentially ground potential and so a negative pulse passes through diode 123 and capacitor 124 to base 2 of UJT 46 within clock unit 10. As a result the UJT conducts, and the voltage on capacitor 44 is discharged through resistor 50. At the same time, the emitter of transistor 120 rises to approximately the potential of positive voltage source 40, and a positive pulse is applied through capacitor 128 and diode 132*a* to the base of transistor 58*a*, turning it on. This turns off transistor 54*a*. Similarly, within the remaining stages 14*b*, 14*c*, . . . 14N of scaler 14, each transistor 58 is turned on, while each transistor 54 is cut off. Thus, clock 10 and scaler 14 are reset by the synchronizing pulse. When transistors 118 and 120 turn off at the end of the synchronizing pulse, the resulting positive pulse on the collector of transistor 118 is blocked by diode 123 and the negative pulse on the emitter of transistor 120 is blocked by the diodes 132.

If the synchronizing pulse applied on line 116 is a pulse which is to be delayed, then its application initiates the timing sequence of the timing circuit. After the desired timing period, as determined by the setting of gating unit 20, an output pulse is generated by the system and applied to the utilizing equipment 32. If it is desired to use the timing circuit as a pulse generator with a period of, for example, 630 microseconds as described above, then the outputs from scaler 14 occurring at the sixth pulse from clock 10 are also gated back to the synchronizing input line 116 in a conventional manner to reset the entire timing circuit. This connection permits the circuit to operate as a free-running pulse generator with a period determined by the patching or connections within gating unit 20.

Use of a digital-to-analog converter as an output device results in a generation of an analog signal having a waveform, the magnitude of which is related to the count from the binary stages 14 and the period of which is determined by the period of clock 10. If a plurality of AND gates 72 and 82 are utilized and their outputs are passed through OR gates to terminal points 74 and 84, respectively, the SCS 106 can be turned on and off a number of times in each cycle of the counter. This permits the generation of complex waveforms as the output of the digital-to-analog converter.

While in the preferred embodiment, the invention has been described utilizing SCS 106 within period control unit 26, other forms of controlled semiconductor switches are equally usable. For example, a silicon-controlled rectifier (SCR) can be utilized. The SCS, however, has the advantage of requiring a lower holding current than does an SCR. Similarly, a transistor can be used in a circuit which turns it on with a pulse from line 22 and turns it off with a pulse from line 24. However, such circuitry is somewhat complex, and accordingly, the SCS is preferred.

In the event that a time period is desired which is an integral multiple of the period of clock 10, then the SCS 106 need not be turned on at all. To insure this, any one of the terminals 76 is patched to terminal 100, thereby placing a ground on the cathode of the corresponding diode 72. This inhibits diode 80 and prevents a positive pulse from appearing on the cathode-gate of SCS 196.

It is thus seen that the present invention can be utilized as a timing circuit, with a variable period, or as a time delay circuit of variable duration. Due to the unique feedback, gating, and switching arrangement, a variety of timing periods can be generated, rather than timing periods which are merely integral mutiples of the basic clock frequency as is the case with the prior art. While several specific embodiments have been shown and described above, it will be obvious to those skilled in the art that various changes and modifications may be made without departing from the invention in its broader aspects. Therefore, it is intended in the appended claims to cover all such changes and modifications as fall within the true spirit and scope of this invention.

What is claimed is:

1. A variable period timing circuit comprising:

(a) an oscillator having a predetermined period;

(b) a scaling circuit having an input connected to receive input signals from said oscillator, and comprising a plurality of stages, each of said stages having at least one output which emits pulses in response to the application of input signals;

(c) means for changing the period of said oscillator;

(d) gating means; and (e) means for selectively applying the outputs from the stages of the scaling circuit to said gating means to actuate said changing means and change thereby the period of said oscillator.

2. A timing circuit as claimed in claim 1 wherein said selectively applying means includes patching means for permitting preselection of desired combinations of said outputs to be applied to said gating means.

3. A timing circuit as claimed in claim 2 in which said changing means comprises a semiconductor switch which is activated by said gating means in response to a first preselected combination of outputs and deactivated in response to a second preselected combination of outputs.

4. A timing circuit as claimed in claim 3 in which said changing means further comprises an impedance in circuit with said semiconductor switch, said impedance serving to change the period of said oscillator when said semiconductor switch is activated by said gating means.

5. A timing circuit as claimed in claim 4 in which said scaling circuit comprises a plurality of binary scaler stages.

6. A timing circuit as claimed in claim 5 in which said oscillator is a pulse generator.

7. A timing circuit as claimed in claim 5, further comprising a synchronizing circuit, said synchronizing circuit being adapted in response to an input synchronizing signal to cause said oscillator to recycle and to cause said scaling circuit to return to an initial condition.

References Cited

UNITED STATES PATENTS

| | | | |
|---|---|---|---|
| 3,217,267 | 11/1965 | Loposer | 331—18 X |
| 3,259,851 | 7/1966 | Brauer | 331—18 X |
| 3,265,986 | 8/1966 | Wyckoff | 331—18 X |
| 3,319,179 | 5/1967 | Hepner | 331—117 X |

ROY LAKE, *Primary Examiner.*

S. H. GRIMM, *Assistant Examiner.*